Dec. 6, 1966   R. L. RONNING   3,289,568
PRODUCT PELLETING AND COOLING APPARATUS
Filed April 14, 1965   2 Sheets-Sheet 1

INVENTOR.
Richard L. Ronning
BY
Hovey, Schmidt, Johnson & Hovey.
ATTORNEYS.

Dec. 6, 1966  R. L. RONNING  3,289,568
PRODUCT PELLETING AND COOLING APPARATUS
Filed April 14, 1965  2 Sheets-Sheet 2

INVENTOR.
Richard L. Ronning
BY
Hovey, Schmidt, Johnson & Hovey.
ATTORNEYS.

United States Patent Office 3,289,568
Patented Dec. 6, 1966

3,289,568
PRODUCT PELLETING AND COOLING
APPARATUS
Richard L. Ronning, 8914 Eby Drive,
Overland Park, Kans.
Filed Apr. 14, 1965, Ser. No. 448,168
13 Claims. (Cl. 99—235)

This invention relates to feed processing equipment, and more particularly, to apparatus for pelleting a crop such as alfalfa or the like.

One of the chief disadvantages of heretofore available feed processing installations has been the lack of an effective means of removing the "fines" from the product during the pelleting operation, especially in a manner to avoid loss of the fine material and consequent waste and expense. Further, equipment which discharges the fine material to atmosphere not only loses this material but also pollutes the surrounding air. This pollution can be so great that it may interfere with operations in the immediate vicinity and may even necessitate shutting down of the pelleting operation for extending periods of time.

It is, therefore, one of the most important objects of this invention to provide crop pelleting apparatus of improved construction for effectively removing fine material during the pelleting process and returning this material to the system.

Another object of the present invention, and which is attainable in the achievement of the foregoing object, is to provide apparatus for minimizing waste attendant upon the pelleting process.

A further important object of the instant invention is to provide apparatus capable of minimizing pollution of the surrounding air resulting from the process of forming the crop into pellets.

Another object of this invention is to provide crop processing apparatus wherein substantially all of the pneumatic conveyors, as well as the cooler and a cyclone separator, are operated at negative fluid pressures to increase the air material separation efficiency of the apparatus and to minimize the chances for particulate material to escape to the atmosphere.

Still another object of the present invention is to provide a pellet cooler of improved construction for effectively cooling the pellets following formation thereof and capable of operating with negative fluid pressure at a relatively constant level to maintain air flow through the cooler and the conduits coupled therewith for pneumatically conveying material to and from the cooler.

A yet further object of the invention is to provide an improved cooler having a pellet inlet situated in relatively close proximity to an air outlet so that fine material entrained in the conveyor air stream is drawn off through the air outlet without gravitating through the tank.

Another object of the instant invention is to provide pelleting apparatus utilizing a minimum of components consistent with effectively removing the fines from the final product, thereby effecting cost reduction and savings on the space necessary for carrying out the operation.

Yet another object of this invention is to provide a system utilizing a novel flat-bottom collector in stacked relationship with a cyclone separator for collecting fine material for return to the pelleter so that economies of space and pneumatic conveying equipment are achieved.

These and other important objects of this invention will be further explained or will become apparent from the following specification and claims.

Figure 1:
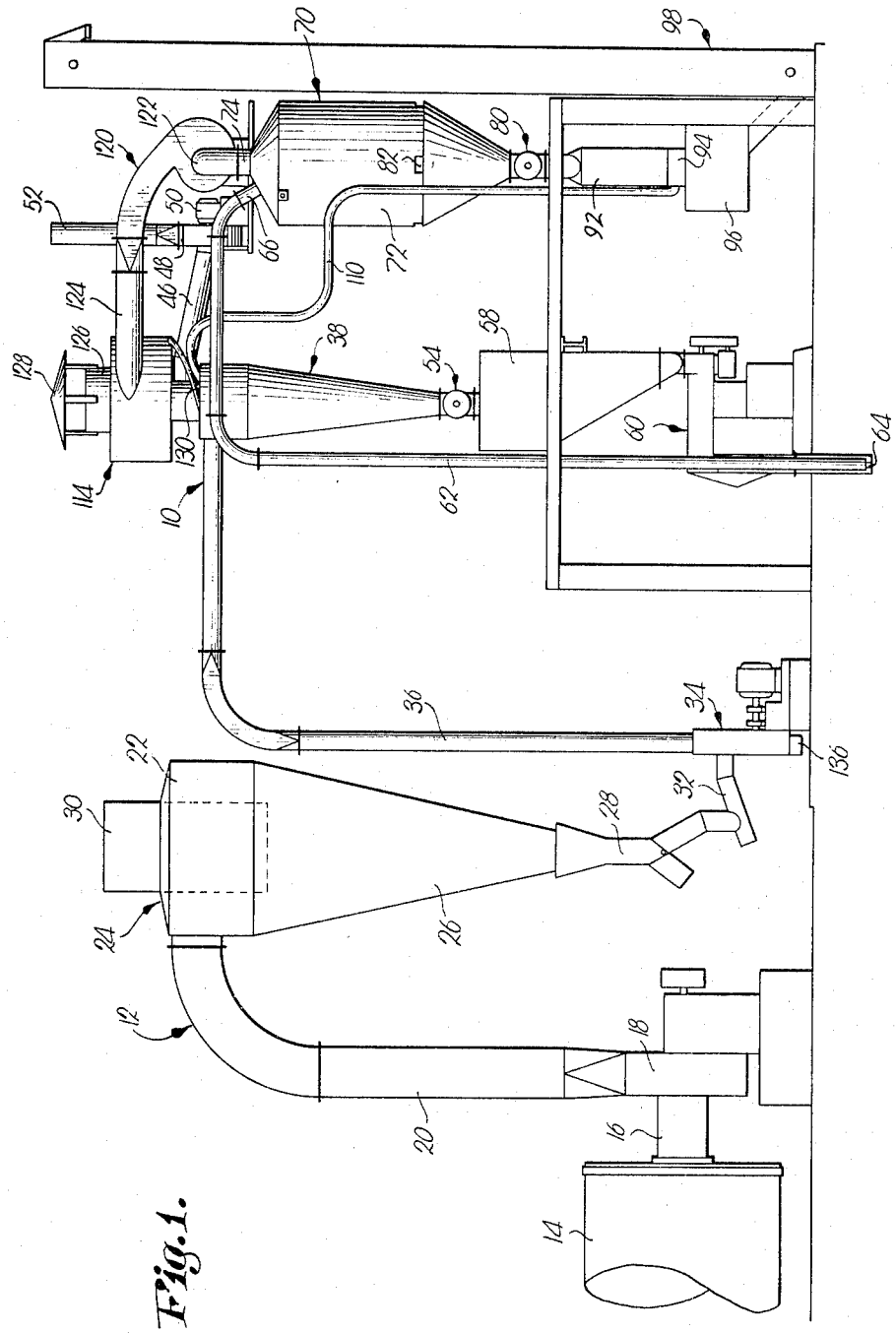
FIGURE 1 is a fragmentary, side elevational view of typical crop processing installation incorporating apparatus embodying the principles of this invention.

Apparatus embodying the principles of this invention is broadly designated 10 and is illustrated in FIG. 1 in connection with crop dehydrating structure 12. Structure 12 may be of any conventional type and as shown, includes a dehydrating drum 14 having an outlet 16 communicating with a blower 18. Blower 18 is operated to draw off the dehydrated material from drum 14 when the moisture content of the latter is reduced to a certain value. The dried material is then forced by blower 18 through conduit 20 into the upper portion 22 of a cyclone separator 24.

Separator 24 is of conventional construction and is of the type wherein the material from conduit 20 enters portion 22 tangentially at relatively high velocity. The centrifugal force of the material causes the latter to be thrown toward the outer wall of portion 22 where the heavier particles of material gravitate into a conical portion 26 for discharge through a spout 28. A cylindrical outlet 30 in the top of separator 24 permits escape of the hot gases and air from separator 24. The material emanating from spout 28 is fed into an inlet 32 of grinder means 34 which may take the form of a hammer mill or the like. It has been found that a hammer mill of the teardrop type is particularly effective for installations of the type herein described. A closed conduit 36 connects the material outlet of grinder 34 with a second cyclone separator 38. It will be noted, particularly in FIG. 3, that conduit 36 is fed tangentially into the upper cylindrical portion 40 of separator 38, whereby the centrifugal force of the material causes the latter to be separated from the air stream and the material gravitates into a conical portion 42 of separator 38.

Air outlet means 44 of separator 38 is connected by a closed conduit 46 with the inlet side of a blower 48 driven by an electric motor 50. An air discharge spout 52 is coupled with the outlet side of blower 48 to discharge air from the latter to atmosphere.

Figure 3:
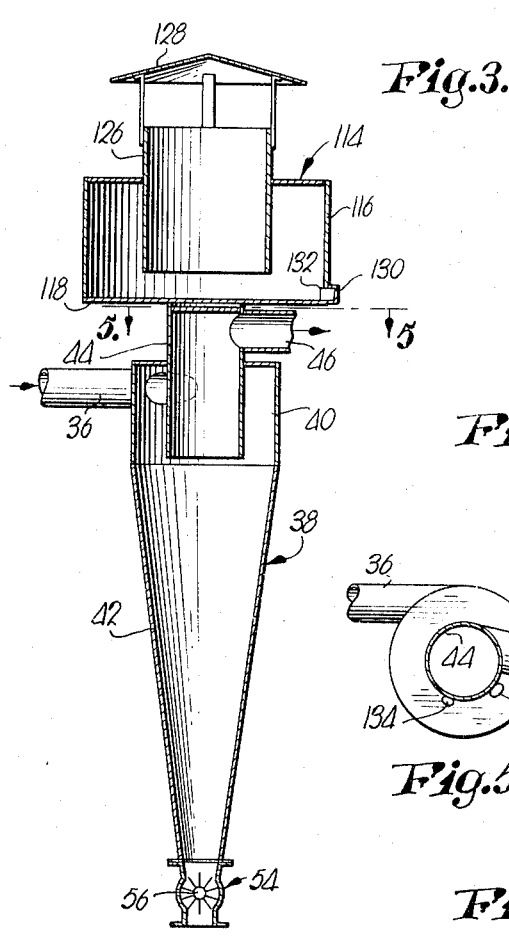
FIG. 3 is an enlarged, vertical, cross-sectional view through the collector and cyclone separator.

A rotary vane air lock, broadly designated 54, is coupled with the material outlet of separator 38, shown best in FIG. 3. The rotor 56 of air lock 54 comprises a plurality of radially extending vanes for discharging material from separator 38 in relatively small increments as rotor 56 revolves. This prevents air from rushing through the material outlet of separator 38 and maintains negative fluid pressure in separator 38 under the influence of blower 48. The material which passes through air lock 54 is received in a bin 58 which communicates with the inlet of a pellet-making machine 60. Machine 60 may be one of a number of available types. It suffices to say that machine 60 is adapted to transform the ground crop emanating from separator 38 into pellets by extrusion or other suitable process.

The pellets from machine 60 are injected into a conduit 62 having an air inlet port 64. Conduit 62 is coupled with a pellet inlet 66 in the upper, frusto-conical portion 68 of a fluid bed pellet cooler 70. Cooler 70 includes a normally closed tank 72 of generally cylindrical configuration having an air outlet opening 74 in top portion 68 and disposed in relatively close proximity to pellet inlet 66 for a purpose to be more fully described hereinafter.

Tank 72 has an integral, frusto-conical bottom portion 76 provided with a pellet outlet 78 in communication with an air lock 80 which may be of identical construction to air lock 54. A plurality of air inlet openings 82 are spaced circumferentially around tank 72 immediately above bottom portion 76 of the latter. A frusto-conical, foraminous member 84 has an upper annular rim 86 secured by welding or other suitable means to the inner annular wall of tank 72 above openings 82, as shown in FIG. 3. The outer wall 88 of member 84 extends in parallelism with the wall of portion 76 and terminates in an open annular end 90 spaced above the pellet outlet 78 of cooler 70. Manifestly, the openings in the foraminous member 84 are sufficiently small to prevent pellets from gravitating therethrough, but are large enough to permit flow of air through member 84 and into cooler 70.

The pellets which are discharged from cooler 70 through air lock 80 enter a mechanical sifter 92. Sifter 92 forms no part of the instant invention per se and will not be described in detail. It suffices to say that sifter 92 may be constructed in conventional manner with an angularly inclined, foraminous rack disposed to receive the pellets from air lock 80 and to mechanically shake the pellets for separating pellet fragments and any other particulate matter into a receiver 94. The whole pellets are then transferred to a weighing means such as a scale 96 or the like. From scale 96, the pellets may be transferred to an elevator 98 where the bulk pellets may be delivered to a rail car, truck tank, storage tank or the like.

Figure 4:
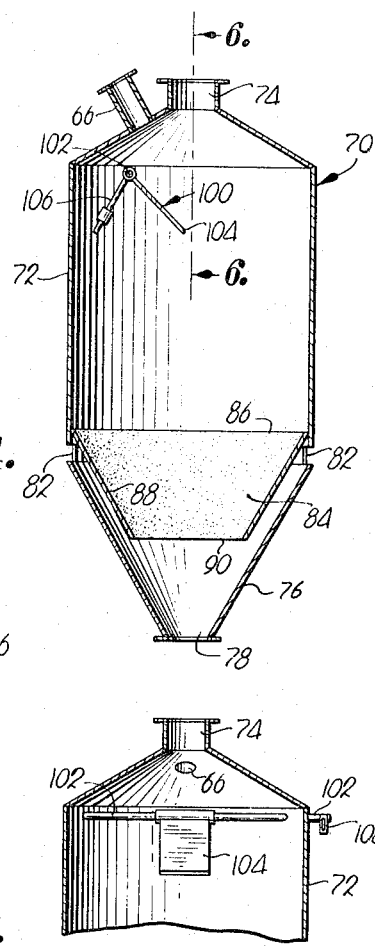
FIG. 4 is an enlarged, vertical, cross-sectional view through the fluid bed cooler.
Figure 6:
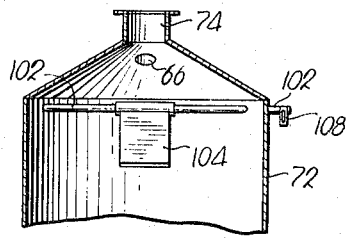
FIG. 6 is a cross-sectional view taken along line 6—6 of FIG. 4.

Referring particularly to FIGS. 4 and 6, cooler 70 is provided with means 100 for sensing the accumulation of a predetermined quantity of pellets in tank 72. Means 100 includes an elongated shaft 102 having a paddle 104 rigidly secured thereto. A counterweight arm 106 is rigidly secured to shaft 102 for biasing paddle 104 into the position illustrated in FIG. 4. Shaft 102 extends exteriorly of tank 72 and has switch means 108 such as a mercury switch or the like secured to shaft 102.

Switch means 108 is operably coupled with the prime mover for air lock 80 to permit intermittent operation of the latter for discharging pellets from cooler 70 to sifter 92. Sensing means 100 operates, however, to maintain a predetermined accumulation of pellets in cooler 70 for a purpose to be more fully explained hereinafter.

A conduit 110 is coupled with the particulate material receiver 94 of sifter 92 and is coupled with an inlet port 112 in the upper cylindrical portion of cyclone separator 38. A centrifugal collector broadly designated 114 comprising a cylindrical body 116 having a closed, flat bottom 118, is mounted on top of the air outlet means 44 of separator 38 as shown in FIG. 3.

Figure 2:
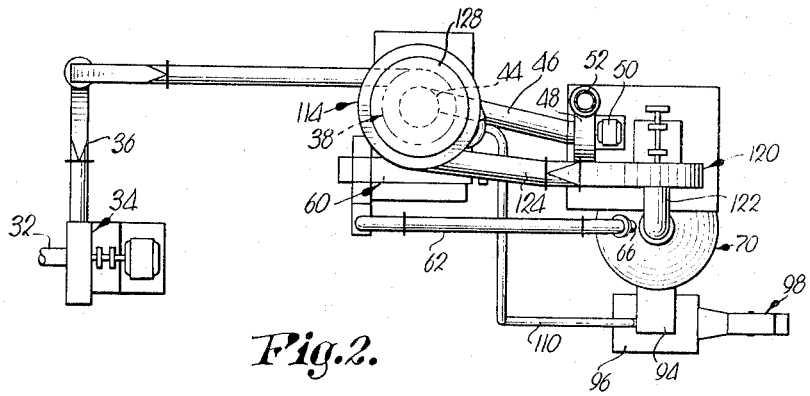
FIG. 2 is a fragmentary, top plan view of the apparatus of FIG. 1.
Figure 5:
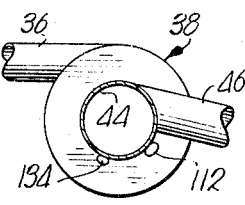
FIG. 5 is a cross-sectional view taken along line 5—5 of FIG. 3.

A blower 120, having the inlet thereof pneumatically coupled with the air outlet 74 of cooler 70 by a conduit 122, has the outlet side of blower 120 coupled with a tangential inlet 124 of collector 114 as shown best in FIGS. 1 and 2. Collector 114 is provided with vertically extending air outlet means 126 and collector 114 serves to separate particulate matter entering through inlet 124 from the air stream while the air discharges through outlet means 126. Cover structure 128 may be provided over outlet means 126 to prevent rain or the like from entering collector 114. A pipe 130 communicates with an opening 132 in the outer wall of body 116 of collector 114 for transferring material from the latter into the top of cyclone separator 38 through a port 134 shown in FIG. 5.

In operation, a dehydrated crop is pulverized by grinder 34 and is drawn through conduit 36 by virtue of the negative fluid pressure in cyclone separator 38 created by blower 48. Manifestly, air inlet means 136 is provided for conduit 36 adjacent grinder 34 to present an air stream in conduit 36 of sufficient velocity to convey the material from grinder 34 to separator 38. The ground material is separated from the air stream in separator 38 and the air is exhausted to atmosphere through spout 52.

The greatest factor which contributes to the separation of material from an air stream in a centrifugal separator is the velocity of the air stream. Further, such separators operate more efficiently under conditions of negative fluid pressure inasmuch as this contributes to a relatively large differential between the specific gravity of the air stream and the entrained material. Thus, motor 50 should have sufficient horsepower for operating blower 48 at an optimum speed to effect virtually complete separation of the material from the air stream, whereby substantially no dust or ground material is discharged to atmosphere through spout 52. The negative fluid pressure in conduit 36 eliminates any possibility of the ground material finding a way out of conduit 36 during transit from grinder 34 to separator 38.

Air lock 54 may operate at a constant speed chosen for maintaining a predetermined amount of negative fluid pressure in separator 38 and to transfer the material from the latter to the pelleter 60. Blower 120 creates negative fluid pressure in cooler 70. The characteristics of blower 120 are such that the negative fluid pressure in cooler 70 creates an air stream in conduit 62 of sufficient velocity for transporting the pellets from machine 60 to cooler 70. Since the pellet inlet 66 of tank 72 is located in relatively close proximity to the air outlet 74 of the latter, the whole pellets are dropped into tank 72, but particulate matter is largely drawn off through air outlet 74 in the air stream. Such particulate matter is transferred through blower 120 and inlet conduit 124 to collector 114 where the same is separated from the air stream for transfer through pipe 130 to separator 38. It should be pointed out that pipe 130 extends downwardly at an angle from collector 114, whereby the particulate material from the latter is not only drawn into separator 38 under the influence of negative fluid pressure therein, but such transfer of material is enhanced by the action of gravity.

A negative fluid pressure in cooler 70 created by blower 120 draws air through openings 82. The updraft of air through tank 72 cools the pellets that are deposited therein after being formed in machine 60. The level of pellets in tank 72 engages paddle 104 and causes the swing of shaft 102. Thus, switch 108 operates in conjunction with air lock 80 to maintain the accumulation of pellets in tank 72 at a predetermined amount as heretofore explained. This insures that the hot pellets entering cooler 70 through inlet 66 are stored in tank 72 for sufficient time to effect the necessary cooling before the pellets are discharged through air lock 80. Broken pellets and particulate material are drawn from receiver 94 of sifter 92 into separator 38 as heretofore explained. Thus, this material is returned to pelleter 60 to be made into pellets. It will be noted that conduit 110 is under negative fluid pressure and this contributes to elimination of loss of such particulate material from the system. Thus, the main material transporting conduits 36, 62, 110 and 130 are all subjected to negative fluid pressure whereby a minimum amount of ground and particulate material is permitted to escape from the system.

The foraminous member 84 deflects pellets away from openings 82 to permit the air to freely enter tank 72. Further, the space between wall 88 of member 84 and the conical portion 76 of tank 72 allows the air to circulate through virtually the entire mass of pellets stored in cooler 70. This contributes to rapid and efficient cooling of the pellets under the influence of the air stream within cooler 70.

The velocities of the various air streams and the sizes of the conduits may obviously be varied to provide optimum conveying and separating characteristics within the installation and to contribute to effective separation of the material from the air streams and proper cooling of the pellets. It has been found, however, that in an installation constructed substantially as illustrated in the drawings, satisfactory results are obtained if blower 48 is of a size and operated at a speed sufficient to create a negative fluid pressure in conduit 46 of approximately $-20$ inches of water column. Further, the negative fluid pressure in conduits 36, 62 and 110 may be between $-6$ and $-7$ inches of water column while the pressure in separator 38 and cooler 70 should be approximately −18 inches of water column respectively. If the pressure in inlet 124 of collector 114 is approximately +3 inches of water column, it has been found that loss of particulate material from the system is kept at a minimum.

Having thus described the invention, what is claimed as new and desired to be secured by Letters Patent is:

1. Apparatus for processing a dehydrated crop comprising:
   a grinder;
   a pelleter;
   a cyclone separator for receiving ground crop from the grinder, the separator having an air outlet and particulate discharge means for discharging heavy particles of crop to the pelleter;
   first conduit means between the grinder and the separator;
   first blower means coupled with the separator air outlet for maintaining negative fluid pressure in the separator and in the first conduit means sufficient to effect pneumatic conveying of ground crop to the separator;
   a fluid bed cooler for receiving pelletized crop from the pelleter, said cooler having a pellet inlet, air inlet means spaced below the pellet inlet, and an air outlet above the air inlet and proximal to the pellet inlet;
   second conduit means between the pelleter and the pellet inlet of the cooler;
   a collector for particulate crop, said collector having an air outlet;
   second blower means coupled with the cooler air outlet for maintaining negative fluid pressure in the cooler and said second conduit means to pneumatically conduct pelletized crop to the cooler and draw air through the cooler, said second blower means having discharge means in communication with the collector for conveying particulate crop entrained in the air from the cooler to the collector; and
   means communicating the collector with the separator for conducting said particulate crop to the separator, whereby the particulate crop is separated from said pellets and returned through the separator to the pelleter.

2. Apparatus as set forth in claim 1, wherein said collector and separator means includes a pneumatic conduit for pneumatically conducting the particulate crop to the separator under the influence of the negative fluid pressure in said separator.

3. Apparatus as set forth in claim 2, wherein the collector is located above and proximal to the separator, the conduit being inclined downwardly from the collector into the separator to minimize the space required for the collector.

4. Apparatus as set forth in claim 1, wherein said pelleter is provided with a discharge outlet, said second conduit means having a section joined to said pelleter discharge outlet in fluid cmmunication therewith and extending vertically therefrom to minimize resistance of flow of pellets through said section of the second conduit means.

5. Apparatus as set forth in claim 1, wherein is included pellet discharge means operably coupled with the cooler for discharging pellets therefrom, said pellet discharge means including air lock structure for maintaining said negative fluid pressure in the cooler while the pellets are discharged.

6. In apparatus for processing a particulate material including a pelleter, means for conveying pellets from the pelleter and a blower, a fluid bed cooler for said pellets comprising:
   a tank provided with an inlet coupled with the pellet conveyor means for receiving pellets into the tank, said tank having an air outlet coupled with the blower for maintaining negative fluid pressure in the tank, and a pellet discharge opening below the pellet inlet;
   pellet discharging means coupled with the tank in communication with the pellet outlet for removing pellets from the tank, said discharging means including air lock structure for maintaining the negative fluid pressure in the tank, there being a plurality of peripherally spaced air inlet openings in the tank between the pellet outlet and the air outlet; and
   a foraminous member extending between the pellet inlet and said openings for deflecting pellets gravitating toward the outlet away from the openings, whereby air entering the openings under influence of the negative fluid pressure in the tank is drawn through the tank to the air outlet for cooling the pellets.

7. A cooler as set forth in claim 6, wherein the air outlet is located in relatively close proximity to the pellet inlet whereby particulate material entering the tank is drawn off by said blower.

8. A cooler as set forth in claim 6, wherein is included control means in the tank and operably coupled with the pellet discharge means for activating the latter, said control means including pellet engageable sensing means for operating the control means to maintain a predetermined accumulation of pellets in the cooler.

9. A cooler as set forth in claim 8, wherein said air inlet openings are disposed below the level of said accumulation of pellets in the tank whereby air traveling through the tank is drawn through the pellets for cooling the latter.

10. A cooler as set forth in claim 6, wherein the cooler is of generally upright, cylindrical configuration, the air outlet being disposed proximal the top of the tank and the pellet inlet being disposed in relatively close proximity to the air outlet, said pellet outlet being proximal the bottom of the tank.

11. A cooler as set forth in claim 10, said tank having an integral, frusto-conical bottom section, the pellet outlet being in said conical section.

12. A cooler as set forth in claim 11, wherein the foraminous member is frusto-conical and extends in concentric, inwardly spaced relationship with said bottom section, the air openings being spaced outwardly from the outer surface of said member.

13. A cooler as set forth in claim 12, wherein said member is provided with an outer, annular top rim, said rim being secured to the inner surface of the tank above the air inlet openings to preclude passage of pellets through said openings.

References Cited by the Examiner
UNITED STATES PATENTS

| | | | |
|---|---|---|---|
| 2,522,342 | 9/1950 | Byers | 99—235 |
| 2,772,642 | 12/1956 | Lindl | 107—4 |
| 3,181,482 | 5/1965 | Heth et al. | 99—235 |

WALTER A. SCHEEL, *Primary Examiner.*

CHARLES A. WILLMUTH, *Examiner.*

R. W. JENKINS, *Assistant Examiner.*